United States Patent
Wild et al.

[19]

[11] Patent Number: 5,873,350
[45] Date of Patent: Feb. 23, 1999

[54] METHOD FOR ADAPTING THE DELAY TIME OF AN ELECTROMAGNETIC TANK-VENTING VALVE

[75] Inventors: Ernst Wild, Oberriexingen; Georg Mallebrein, Singen, both of Germany

[73] Assignee: Robert Bosch GmbH, Stuttgart, Germany

[21] Appl. No.: 816,379

[22] Filed: Mar. 13, 1997

[30] Foreign Application Priority Data

Mar. 15, 1996 [DE] Germany .................. 196 10 169.7

[51] Int. Cl.[6] .................................................. F02M 37/04
[52] U.S. Cl. ........................................... 123/520; 123/458
[58] Field of Search ................................. 123/520, 518,
123/519, 516, 198 D, 458, 500, 501, 494

[56] References Cited

U.S. PATENT DOCUMENTS

| | | | |
|---|---|---|---|
| 4,683,861 | 8/1987 | Breitkreuz | 123/458 |
| 4,788,960 | 12/1988 | Oshizawa | 123/458 |
| 4,865,000 | 9/1989 | Yajima | 123/458 |
| 5,067,469 | 11/1991 | Hamburg | 123/458 |
| 5,111,796 | 5/1992 | Ogita | 123/458 |
| 5,263,460 | 11/1993 | Baxter | 123/458 |
| 5,277,163 | 1/1994 | Ohishi | 123/458 |
| 5,535,719 | 7/1996 | Morikawa | 123/520 |

*Primary Examiner*—Carl S. Miller
*Attorney, Agent, or Firm*—Walter Ottesen

[57] ABSTRACT

The invention is directed to a method for periodically clock driving a through-flow control valve between a first position wherein the valve is closed and a second position wherein the control valve is open to pass a flow of fluid therethrough. The valve is driven by a drive signal having a period duration and the valve opens in response to the drive signal only after a delay time (tv) has elapsed. In the method, the period duration of the drive signal is changed, and a reaction of a variable, which is operatively coupled to the flow, is detected. A value of the delay time (tv) is utilized when forming the drive signals and the value of the delay time (tv) is changed in dependence upon the detected reaction of the variable.

10 Claims, 2 Drawing Sheets

METHOD FOR ADAPTING THE DELAY TIME OF AN ELECTROMAGNETIC TANK-VENTING VALVE

BACKGROUND OF THE INVENTION

Motor vehicles driven by internal combustion engines are often equipped with a so-called tank-venting system, which helps to prevent an emission of fuel vapor from the fuel tank into the ambient. The fuel vaporizes in the tank and is stored in an active-charcoal filter and is supplied to the intake pipe of the engine via a clock-driven electromagnetic tank-venting valve. In this way, the vaporized fuel is supplied for combustion.

Valves of this kind exhibit a lag time or delay time caused by their construction. This time-dependent delay is understood to mean the delay with which the opening cross section of the valve follows its drive signal. The actual open time of the valve is shortened by this delay time. In this way, the quantity of gas flowing (fuel vapor and air) via the tank-venting valve is reduced which becomes very significant especially for short drive times.

In the tank-venting systems, the gas quantity, which flows via the tank-venting valve is varied within wide limits in an open-loop controlled manner or in a closed-loop controlled manner. This gas quantity is varied in dependence upon its fuel concentration and also upon the actual load/rpm operating point of the engine. An adequately precise metering of the gas flow, which flows via the tank-venting valve, must be guaranteed also for a comparatively low total air flow inducted by the engine (for example, during idle). In each case, this requires that the delay time be considered. Up to now, an average delay time was calculated for the formation of the drive signal. This delay time was determined during experiments on individual valves of a type.

However, the delay time can fluctuate from valve to valve and changes because of deterioration for an individual valve.

This problem occurs not only for tank-venting valves but affects, generally, clocked-driven solenoid valves.

SUMMARY OF THE INVENTION

In view of the foregoing, it is an object of the invention to provide a method for determining the delay time specific to a valve of periodically clock-driven solenoid valves.

The method of the invention is for periodically clock driving a through-flow control valve between a first position wherein the valve is closed and a second position wherein the control valve is open to pass a flow of fluid therethrough. The valve is driven by a drive signal having a period duration and the valve opens in response to the drive signal only after a delay time (tv) has elapsed. The method includes the steps of: changing the period duration of the drive signal; detecting a reaction of a variable operatively coupled to the flow; utilizing a value of the delay time (tv) when forming the drive signal; and, changing the value of the delay time (tv) in dependence upon the detected reaction of the variable.

Fuel vapor retaining systems are also known as tank-venting systems. When utilizing a tank-venting system, the following advantages are afforded. The realization of the actual valve-individual delay time in forming the drive signal increases the accuracy with which small quantities can be metered and thereby reduces mixture errors for active tank venting, that is, for a tank-venting valve driven to open. The above realization is obtained by carrying out the method of the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
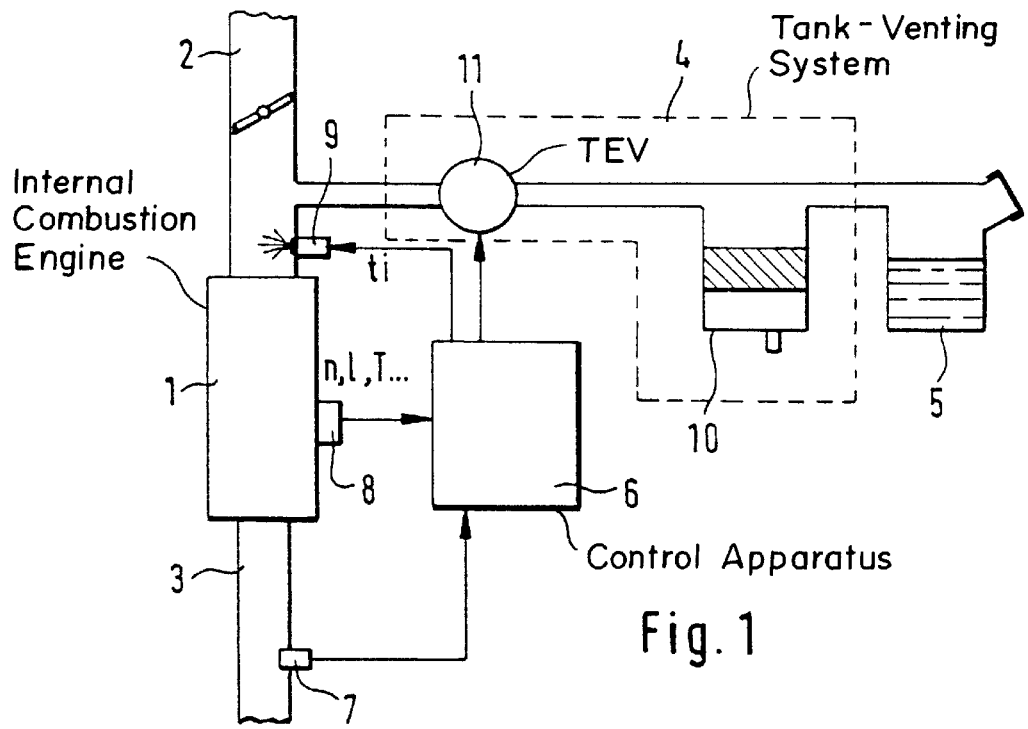
FIG. 1 is a schematic of an internal combustion engine equipped with a tank-venting system.
Figure 3:
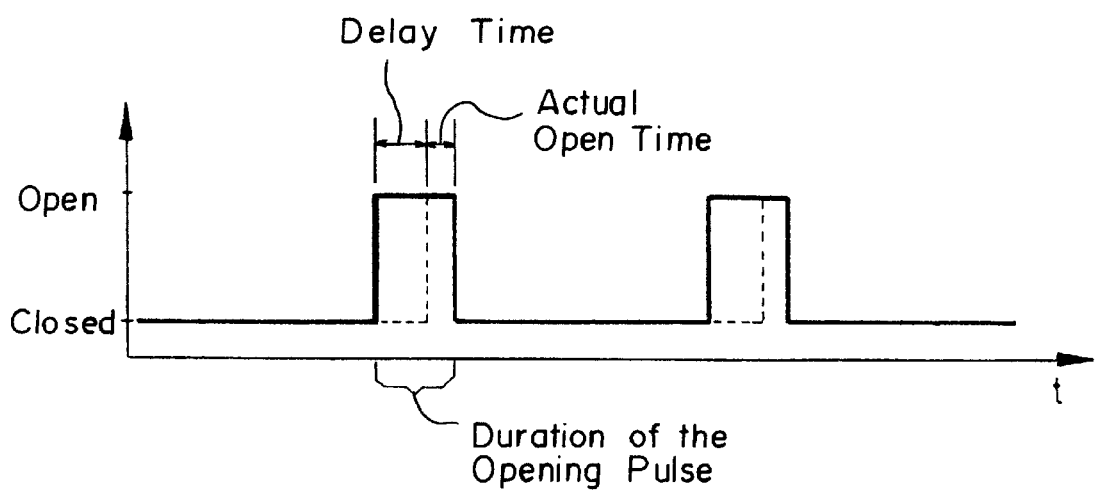
FIG. 3 shows the time-dependent trace of the drive signal for explaining the technical background of the method of the invention.

FIG. 1 shows an internal combustion engine 1 having an intake pipe 2, an exhaust-gas system 3, a tank-venting system 4, a tank 5, a control apparatus 6, an exhaust-gas sensor 7, sensor 8, which schematically represents a plurality of sensors used in the operation of the engine for obtaining operating parameters such as rpm (n), inducted air quantity L, temperature T, et cetera. The engine further includes a fuel-metering device 9, which, for example, can be realized as an arrangement of one or several injection valves. The drive signals for the injection valves are generated from a combination of a precontrol and a control intervention. The precontrol essentially includes the formation of a base value of the drive signal in dependence upon rpm (n) and the load L of the engine. This base value is then multiplicatively corrected in a closed-control loop in dependence upon the exhaust-gas composition which is detected by exhaust-gas sensor 7. Additional corrections consider temperature influences of the engine or of the inducted air as well as the influence of tank venting or of the battery voltage. The corrected signal is then outputted as drive signals ti for the injection valves.

The tank-venting system 4 includes a fuel-vapor retaining unit in the form of an active-charcoal filter 10 which communicates via corresponding lines or connections with the tank 5, the ambient air and the intake pipe 2 of the engine. A tank-venting valve (TEV) 11 is mounted in the line leading to the intake pipe. The active-charcoal filter 10 stores fuel vaporized in the tank 5. For a tank-venting valve 11 driven open by the control apparatus 6, air is drawn by suction from the ambient and through the active-charcoal filter which then releases the stored fuel to the air. This air/fuel mixture is also characterized as a tank-venting mixture or as regenerated gas and influences the composition of the mixture supplied in total to the engine. The mixture supplied in total is also determined by a metering of fuel via the fuel-metering device 9 which is adapted to the inducted air quantity. The fuel inducted by the engine via the tank-venting system can correspond to a portion of approximately one-third or even one-half of the total fuel quantity in extreme cases.

The computation example which follows makes clear the influence of tank venting on the formation of the mixture with reference to typical values as they occur in the area of tank venting in motor vehicles. In this example, the idle air requirement of the engine amounts to approximately 10 m$^3$ per hour. Approximately 4 m$^3$ per hour would flow through the tank-venting valve 11 if it would be permanently open. The tank-venting valve is, however, not permanently open; instead, the valve is driven, for example, at a pulse-duty factor of 1.67%. Stated otherwise, the ratio of the times in which the valve is driven to open to the times in which the valve is driven to close amounts to 1.67:100. Furthermore, it is assumed that the regenerated gas flowing through the open tank-venting valve comprises 100% fuel vapor. This fuel vapor combusts stoichiometrically with air approximately in a volume ratio of 1:30. The air quantity, which is necessary for combusting the fuel vapor (which flows through the tank-venting valve at these values), is computed as $30*1.67:100*4$ m$^3$ per hour or 2 m$^3$ per hour. Stated otherwise: since the inducted air quantity amounts to 10 m$^3$ per hour and 20% thereof, or 2 m$^3$ per hour, however, receives its fuel portion via the tank-venting, only 80% of the fuel quantity needed without tank venting must be injected. A mixture correction factor is necessary in order to correct the tank-venting influence on the mixture balance. This mixture correction factor corresponds to the above-mentioned 20% and is effective in the mixture control loop comprising exhaust-gas probe 7 (control sensor), control apparatus 6 (controller) and injection valve 9 (control positioning member).

The above computation example is applicable for the ideal case which is characterized by a tank-venting valve without delay time or with a precise and properly considered delay time. In the following, it will be shown how the delay time, which occurs for actual tank-venting valves, is effective. The period duration of the drive pulse-duty factor is 100 milliseconds with the period duration being the basis of the computation example. The actual pick-up delay is 3 milliseconds. The pick-up delay should be compensated by including an assumed delay time of 4 milliseconds.

The tank-venting valve is, in this case, driven open for 5.67 milliseconds (1.67 milliseconds+4 milliseconds=5.67 milliseconds). The above-given pulse-duty factor of 1.67% is the basis. The difference of 5.67 milliseconds and 3 milliseconds results in an actual open time of 2.67 milliseconds. Accordingly, the factor 1.67 is not included in the computation of the mixture correction; instead, the factor 2.67 is included. This leads to an increased fuel component of 32%.

In a second example, the period duration of 100 milliseconds is reduced by half to 50 milliseconds. In this case, the drive time without correction is 0.833 milliseconds for a drive pulse-duty factor of 1.67%. The drive time with correction amounts correspondingly to:

0.833 milliseconds+4 milliseconds=4.833 milliseconds.
The actual open time, however, amounts to only:
4.833 milliseconds−3 milliseconds=1.833 milliseconds.

Correspondingly, a factor 1.833 milliseconds:50 milliseconds is included in the computation of the mixture corrective factor which leads to a mixture correction of 44% in the result.

Stated otherwise, switching over the period duration from 100 milliseconds to 50 milliseconds results for a delay time (assumed too large by 1 millisecond), in a change of the fuel component of 44%−32%=12%. The $\lambda$-controller after switchover leans correspondingly, that is, the increase of the fuel component from the tank-venting system leads to an increased fuel component in the combustion mixture which is also characterized as enrichment. This enrichment is detected by the exhaust-gas sensor 7 in FIG. 1 and leads to a reduction of the injected fuel quantity via the closed-loop control comprising exhaust-gas sensor 7, control apparatus 6 and injection-valve device 9.

This recognition is utilized in the method of the invention for adapting the actual pickup delay time.

Figure 2:
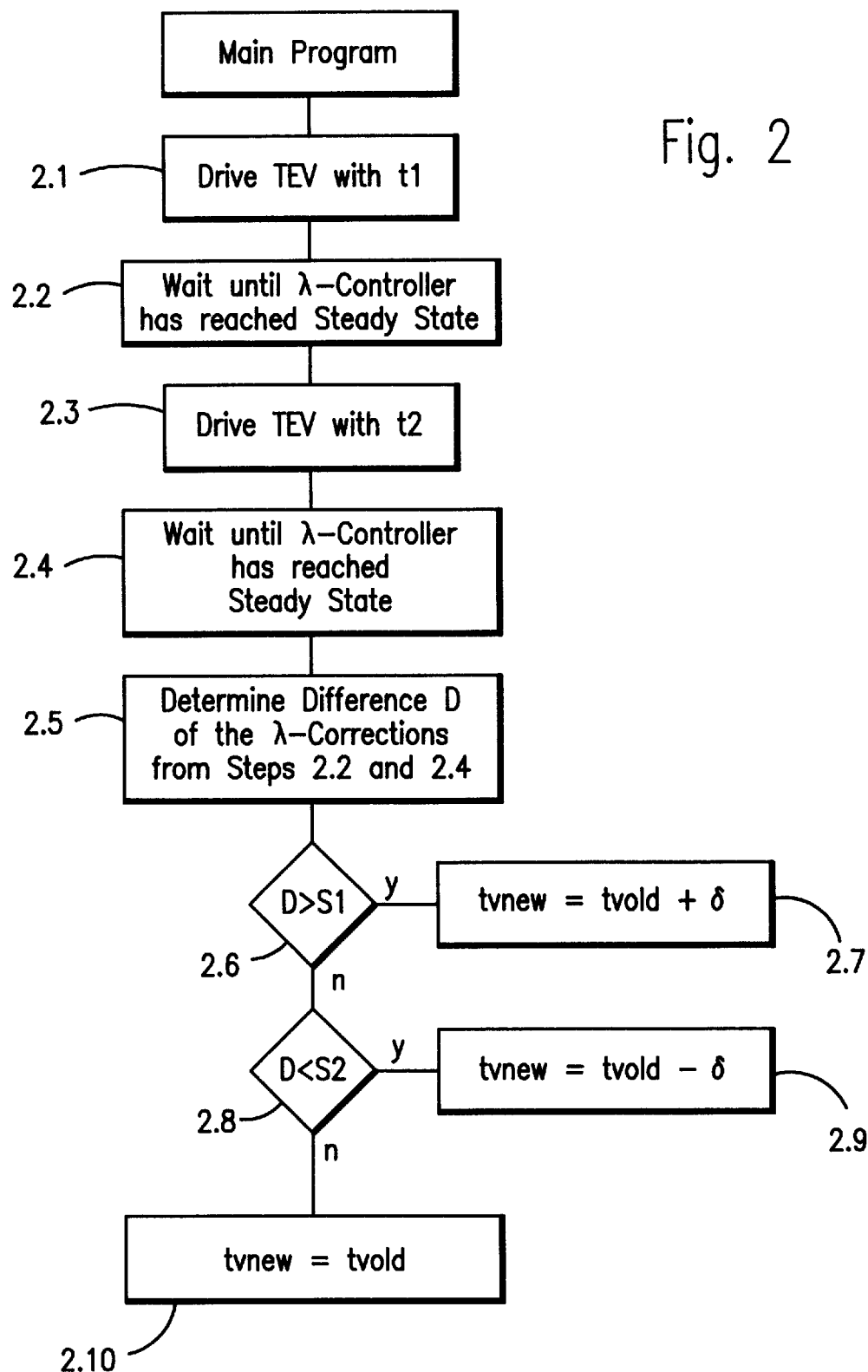
FIG. 2 is a flowchart of the adaptive method of the invention.

An embodiment of the invention is shown in FIG. 2 as a flowchart.

In the method, and in a first step S2.1, the tank-venting valve is driven open at a long period duration t1. After the $\lambda$-controller has reached steady state in step S2.2, a switchover to a lower period duration t2 is carried out in step S2.3. After the output of the $\lambda$-controller has reached steady state in step S2.4, the difference D of the $\lambda$-correction is determined for the large (t1) period duration and the small (t2) period duration. If the difference D is greater than a threshold S1, this means that the controller after the switchover has enriched as a reaction to a mixture leaning and this is determined in step S2.6. And, in step S2.7, a new pickup delay time tvnew is formed by increasing the old pickup delay time tvold by a predetermined amount $\delta$. If, in contrast, the difference D is less than a second threshold S2, this means that a leaning by the controller has taken place after the switchover and this is determined in step S2.8. And, in step S2.9, the new pickup delay time is formed as the difference of the old pickup delay time and a predetermined difference $\delta$. If the difference D is neither greater than S1, nor less than S2, then the computed delay time is essentially correct. This delay time therefore remains unchanged in step S2.10. With the result of steps S2.7, S2.8 or S2.9, the drive signal is formed for the tank-venting valve in the next drive cycles. By repeatedly executing the step sequence, the delay time tv finally adjusts which corresponds to the real conditions.

The evaluation of the reaction of the lambda control loop to the adaption of the delay time in accordance with the invention is made possible by the effective coupling of the lambda control loop and the tank venting. The coupling results from the fact that the tank venting influences the quantity and composition of the mixture supplied to the engine. This influence can also operate on a control loop for controlling the idle rpm because the idle rpm is dependent upon the quantity and the composition of the mixture. Based on this effective coupling between idle rpm and tank venting, the reaction of an idle rpm control can be applied, in principle, to the adaption of the delay time. The same applies for the idle rpm even outside of the idle rpm control or for a switched off rpm control.

In view of this background, the essence of the method of the invention can be shown with the example of a tank-venting valve. With a periodically clock-driven tank-venting valve (whose opening follows its drive signal delayed by a delay time tv) and for which a value for the delay time is considered in the formation of the drive signal, the period duration of the drive signal is changed and the reaction of a variable is detected which is operatively coupled to the tank venting. Thereafter, a new formation or correction of the value of the delay time, which is considered in the formation of the drive signal, takes place in dependence upon the detected reaction. The change of the period duration of the drive signal can, for example, be a shortening of the period duration.

In this case, the value for the delay time is increased when the reaction of the control loop exceeds a predetermined amount and is reduced when the reaction of the variable drops below a predetermined amount. The control loop is operatively coupled to the tank venting. For a lambda control loop, the delay time to be taken into consideration is accordingly increased when the controller enriches after the switchover to a smaller period duration and, the delay time to be taken into consideration is reduced when the controller leans.

Alternatively thereto, a change of the period duration in the direction of lengthening can take place. In this case, the value for the delay time to be considered is reduced when the controller enriches and is increased when the controller leans.

As a variable, which is operatively coupled to the tank venting, as already shown, a variable can be used from a control loop to control the composition of the air/fuel mixture to be supplied to the engine. Examples of such variables are the signal of an exhaust-gas probe, the actuating variable of the controller or a change of the injection times. As an alternative thereto, a variable from a control loop to control the idle rpm can be used as a variable operatively coupled to the tank venting. For this purpose, the control actuating variable of an idle control loop can be used as a variable which is coupled operatively to the tank venting. As a further alternative, the idle rpm itself can be considered as a variable operatively coupled to the tank venting.

It is understood that the foregoing description is that of the preferred embodiments of the invention and that various changes and modifications may be made thereto without departing from the spirit and scope of the invention as defined in the appended claims.

What is claimed is:

1. A method for periodically clock driving a tank-venting valve of a tank-venting system of an internal combustion engine having an intake pipe, the tank-venting system including a fuel-vapor retaining unit wherein fuel vapor is held, said tank-venting valve being connected between said intake pipe and said fuel-vapor retaining unit for controlling the flow of fuel vapor and air from said fuel-vapor retaining unit to said intake pipe, the method comprising the steps of:

providing a drive signal having a period duration for periodically clock driving said tank-venting valve between a first position wherein said tank-venting valve is closed and a second position wherein said tank-venting valve is open to pass said flow therethrough and said tank-venting valve opening in response to said drive signal only after a delay time (tv) has elapsed;

changing said period duration of said drive signal;

detecting a reaction of a variable operatively coupled to said flow;

utilizing a value of said delay time (tv) when forming said drive signal; and, changing said value of said delay time (tv) in dependence upon the detected reaction of said variable.

2. The method of claim 1, wherein the change of said period duration leads to a shortening of said period duration.

3. The method of claim 2, wherein said engine is provided with control loop and said variable is a variable of said control loop; and, wherein the method further comprises the step of increasing said value of said delay time (tv) when the reaction of said variable exceeds a predetermined first amount and decreasing said value of said delay time (tv) when the reaction of said variable drops below a predetermined second amount.

4. The method of claim 1, wherein the change of the period duration of said drive signal leads to a lengthening of said period duration.

5. The method of claim 4, wherein said engine is provided with a control loop and said variable is a variable of said control loop; and, wherein the method further comprises the step of decreasing said value of said delay time (tv) when the reaction of said variable exceeds a predetermined first amount and increasing said value of said delay time (tv) when the reaction of said variable drops below a predetermined second amount.

6. The method of claim 1, wherein said engine is provided with a control loop for controlling the composition of the air/fuel mixture supplied to the engine and said variable is a variable of said control loop.

7. The method of claim 6, wherein the reaction of said control loop is derived from one of the following: the signal of an exhaust gas probe, the positioning variable of the controller of said control loop; and a change of the ignition times.

8. The method of claim 1, wherein said engine is provided with a control loop for controlling the idle rpm of the engine and said variable being a variable of said control loop.

9. The method of claim 1, wherein said variable is the idle rpm of said engine.

10. A method for periodically clock driving a through-flow control valve between a first position wherein said valve is closed and a second position wherein the control valve is open to pass a flow of fluid therethrough, the valve being driven by a drive signal having a period duration and said valve opening in response to said drive signal only after a delay time (tv) has elapsed, the method comprising the steps of:

changing said period duration of said drive signal;

detecting a reaction of a variable operatively coupled to said flow;

utilizing a value of said delay time (tv) when forming said drive signal; and, changing said value of said delay time (tv) in dependence upon the detected reaction of said variable.

* * * * *